US010666984B2

(12) United States Patent
Thirumalai et al.

(10) Patent No.: US 10,666,984 B2
(45) Date of Patent: May 26, 2020

(54) APPARATUS AND METHOD FOR VECTOR-BASED ENTROPY CODING FOR DISPLAY STREAM COMPRESSION

(71) Applicant: QUALCOMM Incorporated, San Diego, CA (US)

(72) Inventors: Vijayaraghavan Thirumalai, San Diego, CA (US); Natan Haim Jacobson, San Diego, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 15/449,755

(22) Filed: Mar. 3, 2017

(65) Prior Publication Data

US 2017/0264918 A1 Sep. 14, 2017

Related U.S. Application Data

(60) Provisional application No. 62/305,380, filed on Mar. 8, 2016, provisional application No. 62/415,999, filed on Nov. 1, 2016.

(51) Int. Cl.
*H04N 19/91* (2014.01)
*H04N 19/13* (2014.01)
*H04N 19/182* (2014.01)
*H04N 19/48* (2014.01)

(52) U.S. Cl.
CPC ............. *H04N 19/91* (2014.11); *H04N 19/13* (2014.11); *H04N 19/182* (2014.11); *H04N 19/48* (2014.11)

(58) Field of Classification Search
CPC ...... H04N 19/70; H04N 19/91; H04N 19/136; H04N 19/13; H04N 19/1887; H04L 1/0057
USPC ........... 375/240.02, 240.12, 240.24; 382/233
See application file for complete search history.

(56) References Cited

U.S. PATENT DOCUMENTS

| 7,055,018 B1* | 5/2006 | Bratt ................... G06F 9/30018 712/4 |
| 2013/0114669 A1* | 5/2013 | Karczewicz ......... H04N 19/176 375/240.02 |
| 2017/0228215 A1* | 8/2017 | Chatwin ................. G06F 7/509 |

OTHER PUBLICATIONS

Gwo Giun Lee, Shu-Ming Xu, Chun-Fu Chen, Ching-Jui Hsiao, "Architecture of high-throughput context adaptive variable length coding decoder in AVC/H.264", Signal & Information Processing Association Annual Summit and Conference (APSIPA ASC) 2012 Asia-Pacific, pp. 1-5, 2012. (Year: 2012).*

(Continued)

*Primary Examiner* — Daniel Chang
(74) *Attorney, Agent, or Firm* — Shumaker & Sieffert, P.A.

(57) ABSTRACT

Methods and apparatus for coding video information having a plurality of video samples include partitioning samples into groups for transmission within a single clock cycle, wherein the samples are associated with a bit length B, and a group having a group size K. The sample group is mapped to a code number and coded to form a vector-based code comprising a first portion identifying a type of look-up-table used to performing the mapping, and a second portion representing the samples of the group. The look-up-table may be constructed based upon occurrence probabilities of different sample groups. In addition, different types of look-up-tables may be used for different B and K values.

8 Claims, 18 Drawing Sheets

(56) References Cited

OTHER PUBLICATIONS

Chen P.Y., et al., "An Efficient Design of Variable Length Decoder for MPEG-1 /2/4," IEEE Transactions on Multimedia, Nov. 1, 2008, vol. 10 (7), pp. 1307-1315, XP011346547.
International Search Report and Written Opinion—PCT/US2017/020897—ISA/EPO—dated Mar. 29, 2017.
Shieh B.J., et al., "A New Approach of Group-based VLC Codec System," Circuits and Systems, ISCAS, May 28, 2000, vol. 4, pp. 609-612, XP010503674.
Shieh B.J., et al., "A New Approach of Group-Based VLC Codec System with Full Table Programmability," IEEE Transactions on Circuits and Systems for Video Technology, Feb. 1, 2001, vol. 11 (2), pp. 210-221, XP011014167.
International Preliminary Report on Patentability—PCT/US2017/020897, The International Bureau of WIPO—Geneva, Switzerland, dated Jun. 16, 2018, 19 pp.

\* cited by examiner

| Clock Cycle | 1 | 2 | 3 | 4 | 5 |
|---|---|---|---|---|---|
| | Parse sample vector 604A prefix/suffix | Decode absolute sample values of 604A | | | |
| | | Parse sample vector 604B prefix/suffix | Decode absolute sample values of 604B | | |
| | | | Parse sample vector 604C prefix/suffix | Decode absolute sample values of 604C | |
| | | | | Parse sample vector 604D prefix/suffix | Decode absolute sample values of 604D |

FIG. 11

| Clock Cycle | 1 | 2 | 3 | 4 |
|---|---|---|---|---|
| | Parse sample vector 604A prefix/suffix | Decode absolute sample values of 604A | | |
| | | Parse sample vector 604B prefix/suffix | Decode absolute sample values of 604D | |
| | | | Parse sample vector 604C prefix/suffix | Decode absolute sample values of 604C |
| | | | | Parse sample vector 604D prefix/suffix |

FIG. 13

150# APPARATUS AND METHOD FOR VECTOR-BASED ENTROPY CODING FOR DISPLAY STREAM COMPRESSION

CROSS-REFERENCE TO RELATED APPLICATIONS

This application claims the benefit of U.S. Provisional Application No. 62/305,380, filed Mar. 8, 2016, and U.S. Provisional Application No. 62/415,999, filed Nov. 1, 2016, both of which are hereby incorporated by reference under 37 CFR 1.57.

TECHNICAL FIELD

This disclosure relates to the field of video coding and compression, and particularly, to video compression for transmission over display links, such as display stream compression (DSC).

BACKGROUND

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

Others have tried to utilize image compression on the pixel data. However, such schemes are sometimes not visually lossless or can be difficult and expensive to implement in conventional display devices.

The Video Electronics Standards Association (VESA) has developed display stream compression (DSC) as a standard for display link video compression. The display link video compression technique, such as DSC, should provide, among other things, picture quality that is visually lossless (e.g., pictures having a level of quality such that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

In one aspect, methods and apparatus for coding video information having a plurality of video samples are disclosed. Video samples are partitioned into groups for transmission within a single clock cycle, wherein the samples are associated with a bit length B, and a group having a group size K. The sample group is mapped to a code number and coded to form a vector-based code comprising a first portion identifying a type of look-up-table used to performing the mapping, and a second portion representing the samples of the group. The look-up-table may be constructed based upon occurrence probabilities of different sample groups. In addition, different types of look-up-tables may be used for different B and K values.

BRIEF DESCRIPTION OF THE DRAWINGS

FIG. 11 illustrates an exemplary graph illustrating a number of clock cycles that may be needed to parse and decode sample vectors coded using sign-magnitude.

FIG. 13 illustrates an exemplary graph illustrating a number of clock cycles that may be needed to parse and decode sample vectors coded using a hybrid coding scheme.

DETAILED DESCRIPTION

Figure 1A:
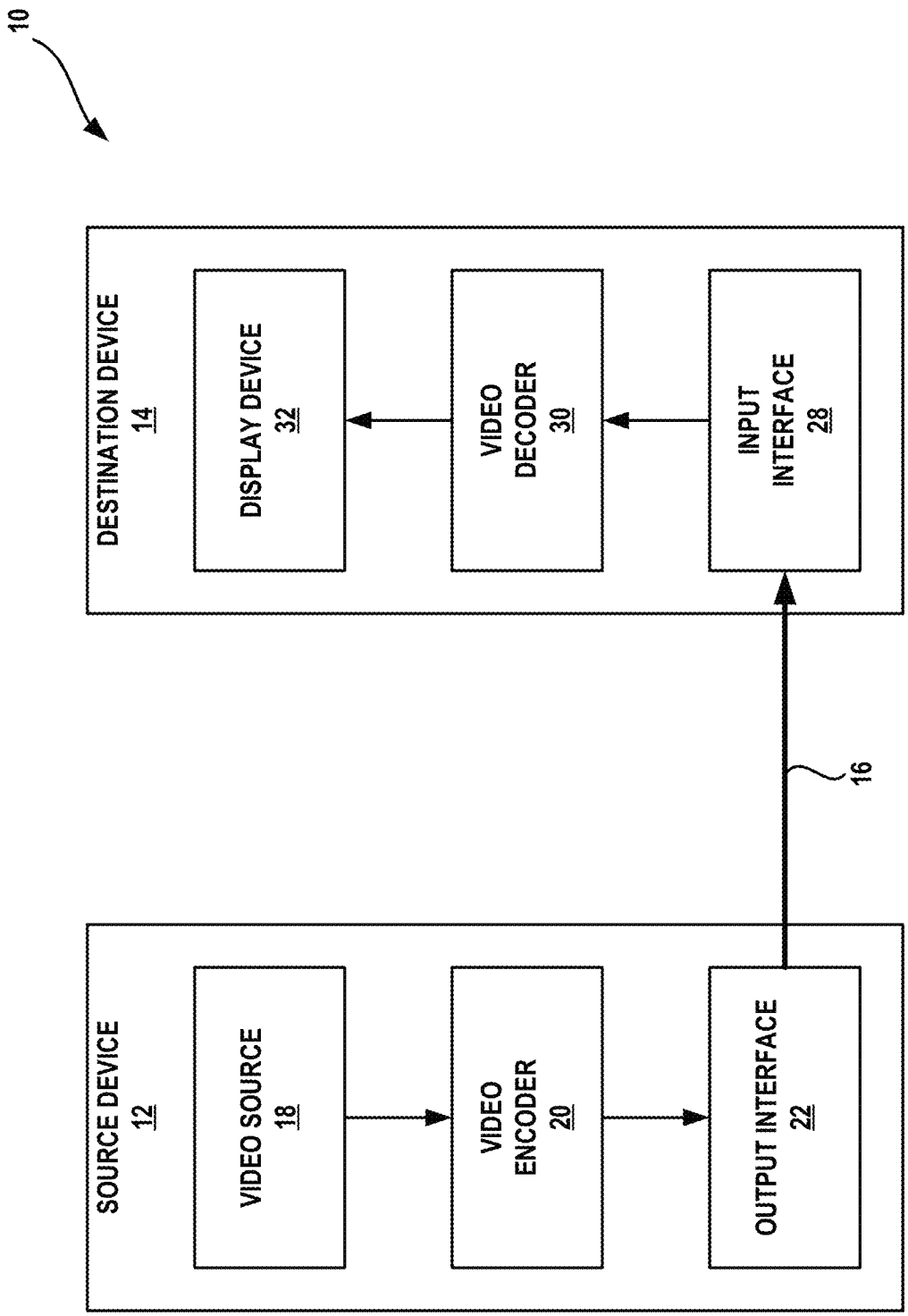
FIG. 1A is a block diagram illustrating an exemplary video encoding and decoding system that may utilize techniques in accordance with aspects described in this disclosure.

In general, the present disclosure relates to techniques of improving video compression techniques such as display stream compression (DSC). More specifically, this disclosure relates to systems and methods for transmitting multiple sample values per clock cycle by partitioning block values into sample vectors, and coding the sample vectors based at least in part upon an occurrence probability of the sample vectors.

While certain embodiments are described herein in the context of the DSC standard, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. The techniques described herein may be particularly applicable to standards which incorporate a constant bit rate (CBR) buffer model. Also, the techniques described in this disclosure may become part of standards developed in the future. In other words, the techniques described in this disclosure may be applicable to previously developed video coding standards, video coding standards currently under development, and forthcoming video coding standards.

The concepts of this disclosure may be integrated in or a be part of a codec (e.g., DSC) that includes several elements and/or modes aimed at encoding/decoding various types of content with substantially visually lossless performance. This disclosure provides systems and methods for partitioning video samples into groups for transmission within a single clock cycle, wherein the samples are associated with a bit length B, and a group having a group size K. The sample group can be mapped to a code number and coded to form a vector-based code comprising a first portion identifying a type of look-up-table used to performing the mapping, and a second portion representing the samples of the group. The look-up-table may be constructed based upon occurrence probabilities of different sample groups. In addition, different types of look-up-tables may be used for different B and K values, allowing for more efficient coding.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an exemplary video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
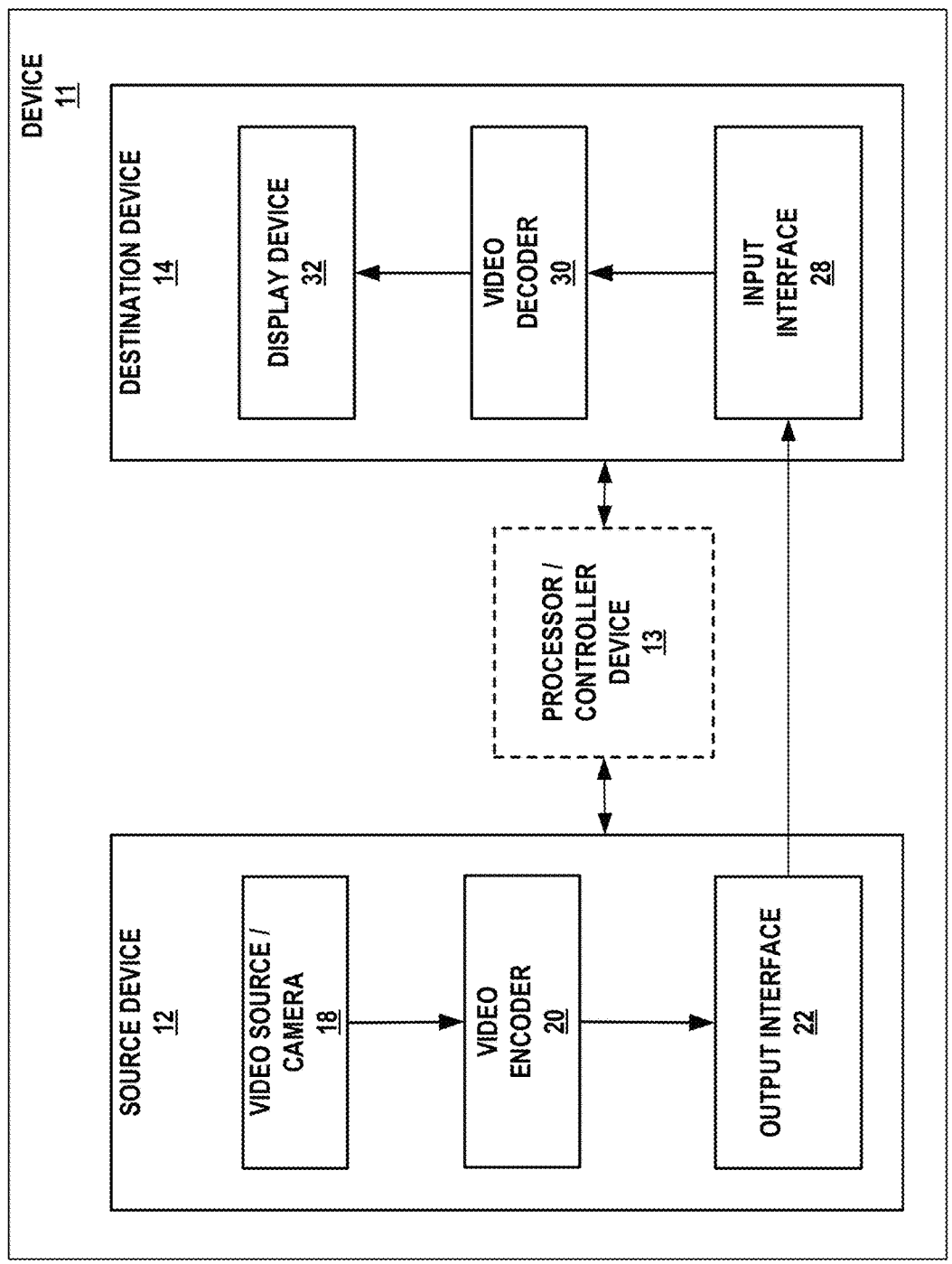
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, video streaming devices, devices that are wearable (or removeably attachable) by (to) an entity (e.g., a human, an animal, and/or another controlled device) such as eyewear and/or a wearable computer, devices or apparatus that can be consumed, ingested, or placed within an entity, and/or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated in FIG. 2B or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an exemplary video coding system 10' wherein the source device 12 and the destination device 14 are on or part of a device 11. The device 11 may be a telephone handset, such as a "smart" phone or the like. The device 11 may include a processor/controller device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a QP. To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or each image or video frame may be encoded in several slices. In DSC, the target bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2A:
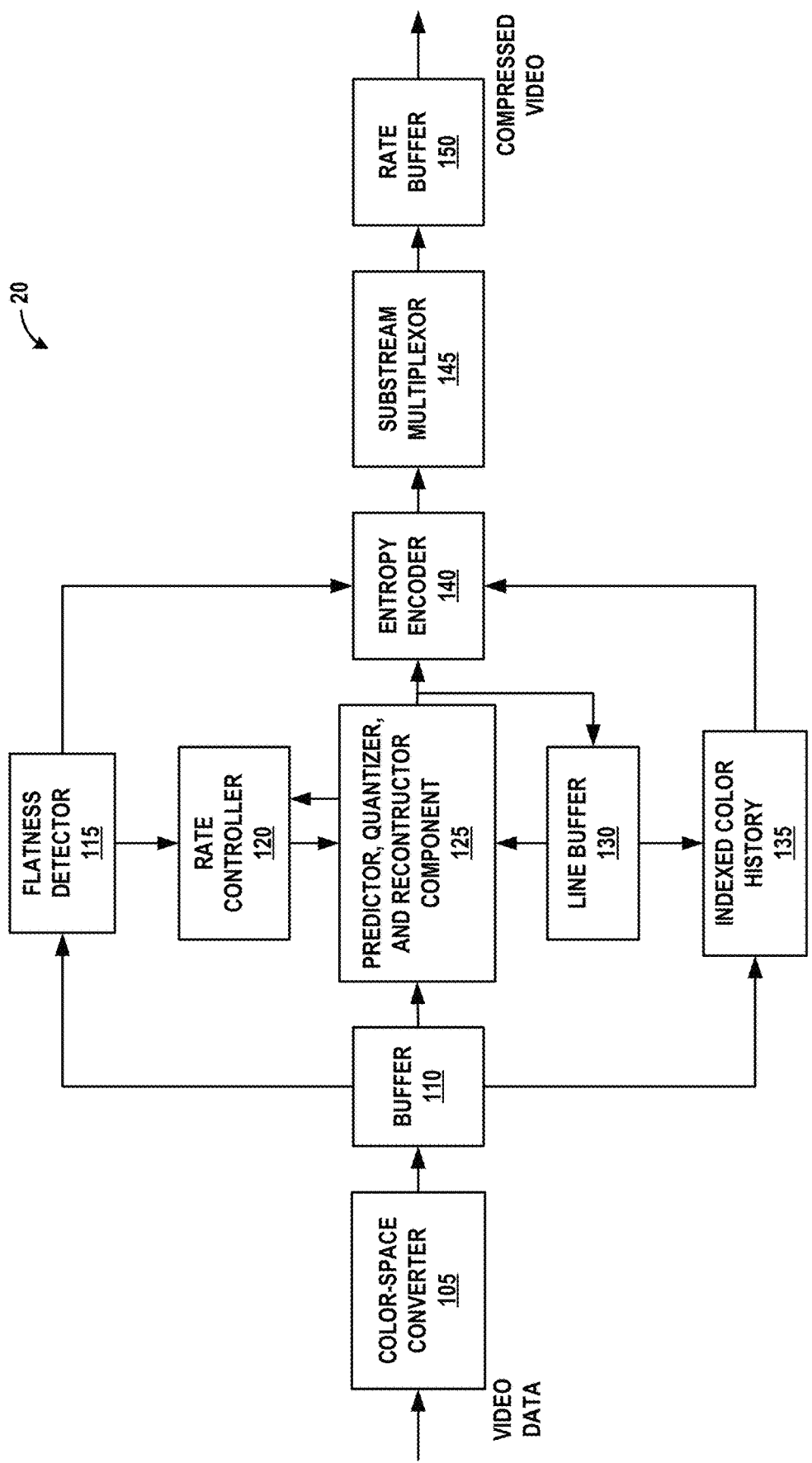
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer, 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space 105 converter may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCgCo) color-space. The color-space conversion may be performed by method(s) including shifts and additions to the video data. It is noted that input video data in other color-spaces may be processed and conversions to other color-spaces may also be performed.

In related aspects, the video encoder 20 may include the buffer 110, the line buffer 130, and/or the rate buffer 150. For example, the buffer 110 may hold the color-space converted video data prior to its use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding each block can vary highly substantially based on the nature of the block. The rate buffer 150 can smooth the rate variations in the compressed video. In some embodiments, a CBR buffer model is employed in which bits are taken out from the buffer at a constant bit rate. In the CBR buffer model, if the video encoder 20 adds too many bits to the bitstream, the rate buffer 150 may overflow. On the other hand, the video encoder 20 must add enough bits in order to prevent underflow of the rate buffer 150.

On the video decoder side, the bits may be added to rate buffer 155 of the video decoder 30 (see FIG. 2B which is described in further detail below) at a constant bit rate, and the video decoder 30 may remove variable numbers of bits for each block. To ensure proper decoding, the rate buffer 155 of the video decoder 30 should not "underflow" or "overflow" during the decoding of the compressed bit stream.

In some embodiments, the buffer fullness (BF) can be defined based on the values BufferCurrentSize representing the number of bits currently in the buffer and BufferMaxSize representing the size of the rate buffer 150, e.g., the maximum number of bits that can be stored in the rate buffer 150 at any point in time. The BF may be calculated as:

$$BF=((BufferCurrentSize*100)/BufferMaxSize)$$

It is noted that the above approach to calculating BF is merely exemplary, and that the BF may be calculated in any number of different ways, depending on the particular implementation or context.

The flatness detector 115 can detect changes from complex (e.g., non-flat) areas in the video data to flat (e.g., simple or uniform) areas in the video data, and/or vice versa. The terms "complex" and "flat" will be used herein to generally refer to the difficulty for the video encoder 20 to encode the respective regions of the video data. Thus, the term complex as used herein generally describes a region of the video data as being complex for the video encoder 20 to encode and may, for example, include textured video data, high spatial frequency, and/or other features which are complex to encode. The term flat as used herein generally describes a region of the video data as being simple for the video encoder 20 to encoder and may, for example, include a smooth gradient in the video data, low spatial frequency, and/or other features which are simple to encode. The transitions from complex to flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified. Similarly, transitions from flat to complex regions may be used by the video encoder 20 to increase the QP in order to reduce the expected rate required to code a current block.

The rate controller 120 determines a set of coding parameters, e.g., a QP. The QP may be adjusted by the rate controller 120 based on the buffer fullness of the rate buffer 150 and image activity of the video data (e.g., a transition from complex to flat regions or vice versa) in order to maximize picture quality for a target bit rate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that it satisfies the bit-rate constraint, e.g., the overall actual coding rate fits within the target bit rate. Thus, one purpose of the rate controller 120 is to determine a set of coding parameters, such as QP(s), coding mode(s), etc., to satisfy instantaneous and average constraints on rate while maximizing rate-distortion performance.

The predictor, quantizer, and reconstructor component 125 may perform at least three encoding operations of the video encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels in the line above or to the left in the same line. In some embodiments, the video encoder 20 and the video decoder 30 may both perform an identical search on reconstructed pixels to determine the block prediction usages, and thus, no bits need to be sent in the block prediction mode. In other embodiments, the video encoder 20 may perform the search and signal block prediction vectors in the bitstream, such that the video decoder 30 need not perform a separate search. A midpoint prediction mode may also be implemented in which samples are predicted using the midpoint of the component range. The midpoint prediction mode may enable bounding of the number of bits required for the compressed video in even the worst-case sample.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals and any other data (e.g., indices identified by the predictor, quantizer, and reconstructor component 125) received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

DSC Video Decoder

Figure 2B:
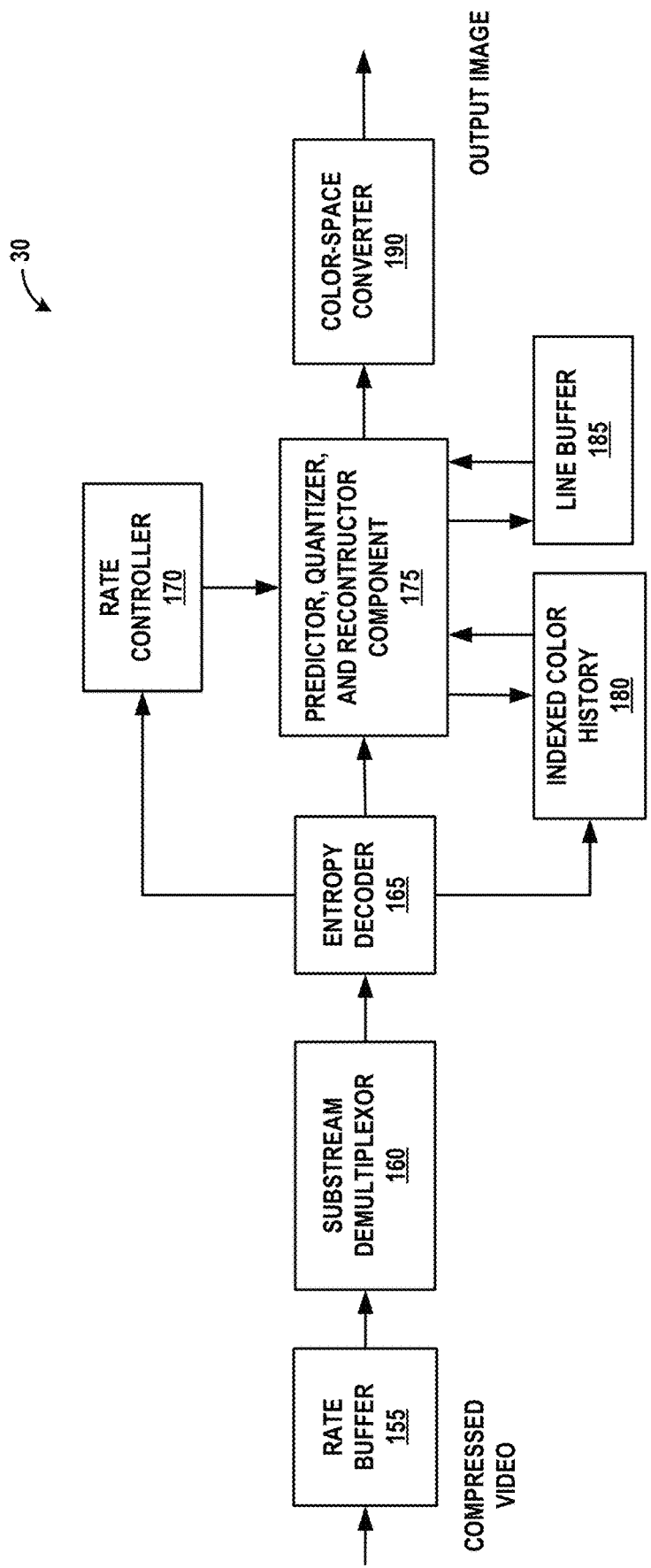
FIG. 2B is a block diagram illustrating an example of a video decoder that may implement techniques in accordance with aspects described in this disclosure.

FIG. 2B is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video decoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above.

QP Calculation

In one approach, the rate controller 120 may derive or calculate the QP for a current block of video data (denoted as currQP) based on the following equation:

$$currQP = prevQ + QpAdj * (diffBits > 0 ? 1 : -1),$$

where prevQP is the QP associated with the previous block, and QpAdj is a QP offset value (e.g., a QP adjustment value) that may calculated based on the magnitude of diffBits. DiffBits represents the difference between the previousBlockBits and targetBits, where previousBlockBits represents the number of bits used to code the previous block, and targetBits represents a target number of bits in which to code the current block. When previousBlockBits>targetBits, diffBits is positive, and the rate controller 120 may derive the QP of the current block (currQP) by adding the offset value QpAdj to the prevQP value. In other words, the QP value currQP does not decrease in value from the prevQP value when diffBits is positive. When previousBlockBits<targetBits, diffBits is negative or zero, and currQP as derived by the rate controller 120 does not increase from the prevQP value. It is noted that in some embodiments, the rate controller 120 may calculate the offset value QpAdj as a function of diffBits in such a way that QpAdj monotonically increases as the magnitude of diffBits increases.

Figure 3:
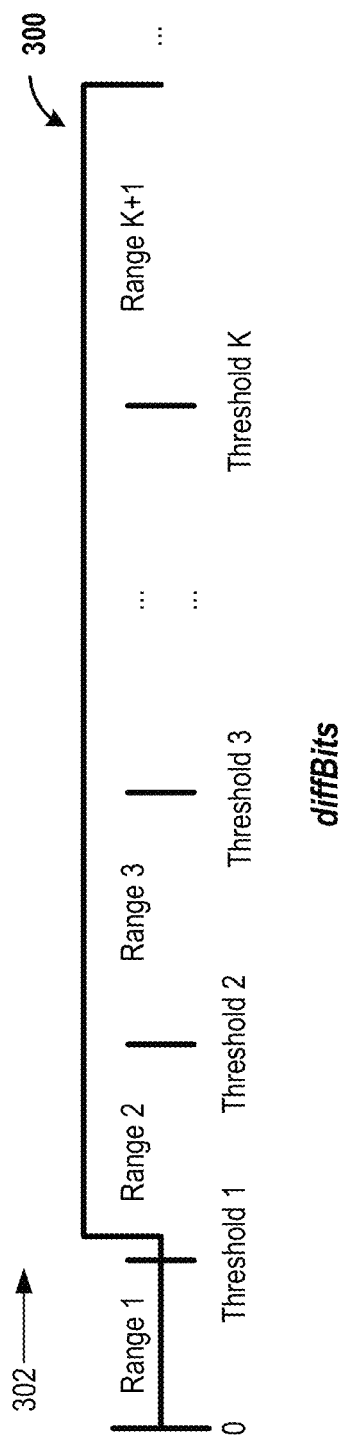
FIG. 3 shows an exemplary approach to determining quantization parameter (QP) adjustment value(s).

FIG. 3 illustrates a graph 300 depicting an exemplary technique for calculating the QP adjustment value QpAdj. The graph 300 illustrates a horizontal axis 302 on which values of diffBits starting at zero are plotted. In some implementations, when diffBits>0, the value of diffBits may be classified into K+1 ranges using K threshold values. The K threshold values are illustrated in FIG. 3 by the labels Threshold 1, Threshold 2, Threshold 3, . . . , and Threshold K, while the K+1 ranges are illustrated by the labels Range 1, Range 2, Range 3, . . . , and Range K+1. Each range of the K+1 ranges may be associated with a specific QpAdj value. For example, the rate controller 120 may increase the QpAdj value as the range index of the value of diffBits increases. In some embodiments, when diffBits<0, the rate controller 120 may classify the absolute value of diffBits into J+1 ranges using J threshold values (not illustrated), with a specific QpAdj value assigned for each of the J+1 ranges.

In other aspects, the rate controller 120 may adjust the currQP value based on the fullness of the buffer 110 illustrated in FIG. 2A, in order to prevent underflow and/or overflow of the buffer 110. The fullness of the buffer 110 may be represented in terms of a calculated buffer fullness parameter BF. In particular, when BF exceeds a certain threshold (e.g., $P_1$), the rate controller 120 may increment currQP by a fixed offset value (e.g., $p_1$). For example, currQP may be adjusted as follows: currQP+=$p_1$. Further, when BF falls below a certain threshold (e.g., $Q_1$), the rate controller 120 may decrement currQP by a fixed value $q_1$, e.g., currQP-=$q_1$. In certain aspect, a plurality of thresholds for BF may be employed, similar to the thresholds and ranges illustrated in connection with diffBits in FIG. 3. For example, each threshold value of BF may be associated with a corresponding offset value to adjust currQP.

Delta Size Unit—Variable Length Coding

In some embodiments, the coder (e.g., video encoder 20 or video decoder 30) may use delta size unit (DSU) coding to provide for low cost, fixed rate visually lossless compression. The coder may be designed based on a block-based approach (with block size P×Q) and comprise a multitude of coding modes. For example, coding modes for each block of video data may include, but are not limited to, transform (e.g., DCT, Hadamard), block prediction, DPCM, pattern, mid-point prediction (MPP), and mid-point predication fall back (MPPF) mode. In some embodiments, several different coding modes can be implemented by the encoder 20 in order to effectively compress different types of contents or images. For example, in some embodiments, the encoder 20 may compress text images using pattern mode, and natural images using transform mode.

In some embodiments, the encoder 20 selects, chooses, or determines a coding mode from the plurality of coding modes for each respective block of video data based upon a rate-control mechanism (e.g., rate controller 120 as illustrated in FIG. 2A). The encoder 20 may also signal the selected coding mode in the video data bitstream, such that the decoder 30, upon receipt of the bitstream, may be able to determining the coding mode used to code the video data. The rate controller 120 may aims to select an effective coding mode for each block by considering both the rate and the distortion of the mode. The rate controller 120 may be supported by a buffer model associated with the buffer 110 (as illustrated in FIG. 2A) or other type of memory for storing incoming block data. The buffer 110 may be configured, for example in accordance with a requirement of a codec such as DSC, such that the buffer 110 is never in a state of underflow (e.g., fewer than zero bits in the buffer) or overflow (e.g., buffer size has increased past a set maximum size).

As discussed above, the predictor, quantizer, and reconstructor component 125 of the encoder 20 may perform quantization that may introduce loss in a block of coded video data, wherein the amount of loss can be controlled by a quantization parameter (QP) of the block. For example, in some embodiments, the predictor, quantizer, and reconstructor component 125 may perform quantization by dropping one or more bitplanes, wherein the number of bitplanes dropped may be indicated by a quantization step size associated with the QP of the block. In some embodiments, instead of the encoder 20 storing a quantization step size for each QP, the encoder 20 may specify a scaling matrix as a function of QP. The quantization step size for each QP can be derived from the scaling matrix, and wherein the derived value is not necessarily a power of two, e.g., the derived value can also be a value equaling a non-power of two. In some embodiments, the use of the scaling matrix by the encoder 20 may allow for the predictor, quantizer, and reconstructor component 125 to perform quantization with more granularity than simply removing bitplanes, potentially increasing performance.

In some embodiments, if all the values of a single component (e.g., a particular color component, a luma or chroma component, etc.) in a given block of video data are zero, then the encoder 20 may effectively code the block using skip mode. In skip mode coding, the encoder 20 may code a syntax element or indicator (e.g., a 1-bit flag) that may be read by the decoder 30 that indicates if the current block is coded using skip mode (if all values of a component are zero for the current block) or not in skip mode (if at least one value of the component in the block is non-zero).

In some embodiments, the encoder 20 may use delta size unit-variable length coding (DSU-VLC) to code quantized residual values of a K-length sample vector (also referred to as a "group") using prefix parts and suffix parts. Samples can refer to the value in a single color component, e.g., for RGB 444, each pixel has three samples. The prefix part indicates the size (e.g., length in bits) of the residual value (the size is denoted as B bits) that follows the suffix part, while suffix part indicates the actual residual values of all samples in the sample vector. In some embodiments, each of the K residual values in the group are coded in two's complement using the same number of bits.

Figure 4:
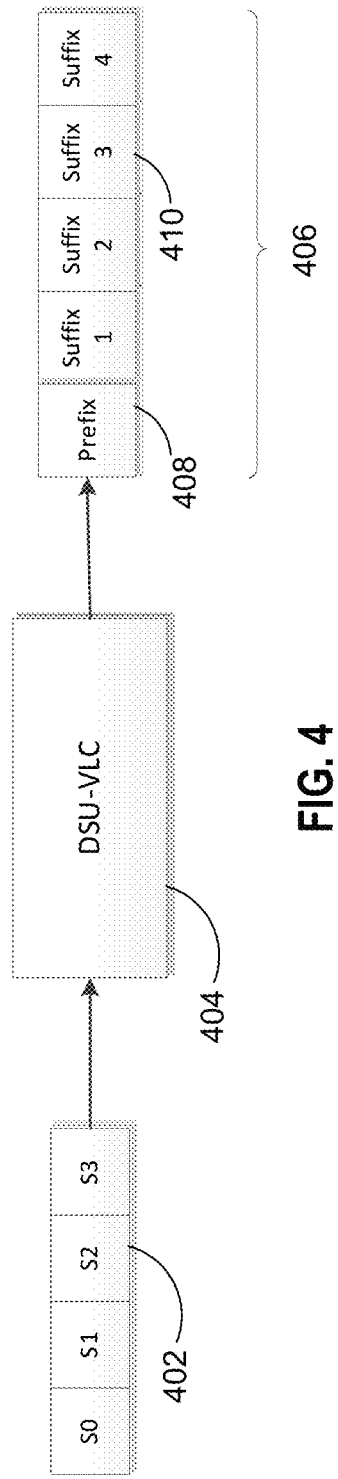
FIG. 4 shows a DSU-VLC structure for a vector with K=4 samples.

FIG. 4 shows a DSU-VLC structure 404 for coding a sample vector 402 with K=4 samples, in accordance with some embodiments. In some embodiments, the DSU-VLC structure 404 may correspond to the entropy encoder 140 as illustrated in FIG. 2A. The sample vector 402 may comprise a plurality of samples, each corresponding to a residual value of a particular color component of video data. As illustrated in FIG. 4, the sample vector 402 may comprise four samples (S0, S1, S2, and S3). The DSU-VLC structure 404 may code the received sample vector 402 to form a DSU-VLC code 406 (hereinafter, code 406). The code 406 comprises a prefix 408 and a suffix 410. The suffix 410 comprises a plurality of suffix portions (e.g., suffix 1, suffix 2, etc.), each corresponding to a received sample (e.g., S0, S1, etc.) of the sample vector 402. Further description of the prefix 408 and suffix 410 of the code 406 are described below with reference to FIG. 5.

Figure 5:
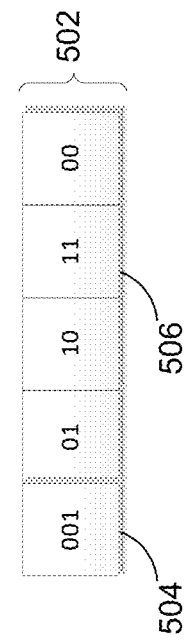
FIG. 5 illustrates a DSU-VLC code for an exemplary group of 4 samples.

FIG. 5 illustrates a code 502 that may be coded by the entropy encoder 140 for a sample vector (not shown) that comprises 4 samples having values [1, −2, −1, 0]. The code 502 may correspond to the code 406 illustrated in FIG. 4. In addition, the code 502 comprises a prefix 504 and a suffix 506 (which may correspond to prefix 408 and suffix 410 of FIG. 4, respectively). The suffix 506 comprises four suffix portions, each corresponding to a sample value of the sample vector.

Using two's complement representation, the entropy encoder 140 may use B=2 bits to code each of the samples of the sample vector. In the code 502, the prefix 504 may be represented using the unary code '001,' which indicates that the length of each of the coded suffix portions of the suffix 506 is 2 bits. The suffix 506 may be represented by the values [01, 10, 11, 00] which respectively represent the actual coded sample values sample vector, each coded using 2 bits. By decoding the prefix 504, which may usually be done in a single clock, the decoder 30 may be able to decode all the 4 symbols of the suffix 506 in parallel.

Group Partitioning

Figure 6:
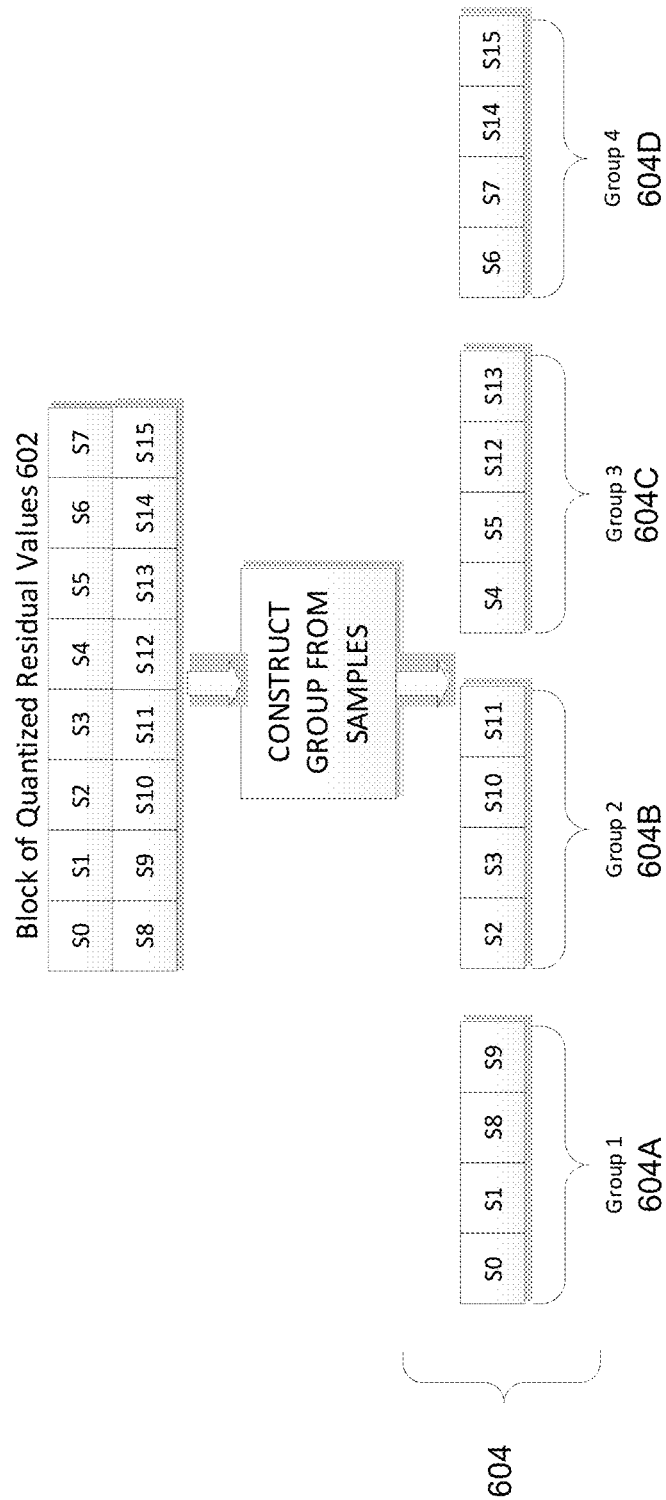
FIG. 6 illustrates an example of uniform grouping, where a 2×8 block is partitioned into 4 groups.

FIG. 6 illustrates an example of partitioning the samples of a given P×Q block of video data into a plurality of sample vectors (groups), in accordance with some embodiments. As illustrated in FIG. 6, the block 602 may be a 2×8 block comprising 16 samples. Each sample of the block 602 may correspond to a quantized residual value of a particular color component of the video data corresponding to the block 602. Before the samples are coded using the DSU-VLC structure 404, the encoder 20 may partition the samples into a plurality of groups. For example, FIG. 6 illustrates the 16 samples of the block 602 partitioned into four sample vectors 604 each comprising 4 samples (e.g., sample vectors 604A, 604B, 604C, and 604D). The DSU-VLC structure 404 may code sample vectors 604A-604D to produce codes (not shown) each having a prefix and a suffix (e.g., as illustrated in FIG. 4). As described above, the decoder 30 (as illustrated in FIG. 3) may be able to decode the prefixes and suffixes of each of the codes in parallel, allowing for the decoder 30 to decode 4 samples per clock cycle.

By using the encoder 20 to partition the samples of the block 602 into groups, a throughput of multiple samples per clock can be achieved by the decoder 30 when decoding the coded groups. While FIG. 6 illustrates the samples of the block 602 being partitioned uniformly into sample vectors 604, it is understood that the encoder 20 may partition a block of samples into N sample vectors uniformly or non-uniformly. In a uniform grouping method, all N sample vectors 604 will have an equal number of samples. On the other hand, the number of samples in each sample vector 604 may be different when using a non-uniform grouping method.

In some embodiments, whether the partitioning of the block 602 is uniform or non-uniform may be based upon a coding mode associated with the block 602. For example, the encoder 20 may use uniform grouping methods in block prediction mode, while using non-uniform grouping methods in transform mode.

Vector-Based Entropy Coding

Figure 7:
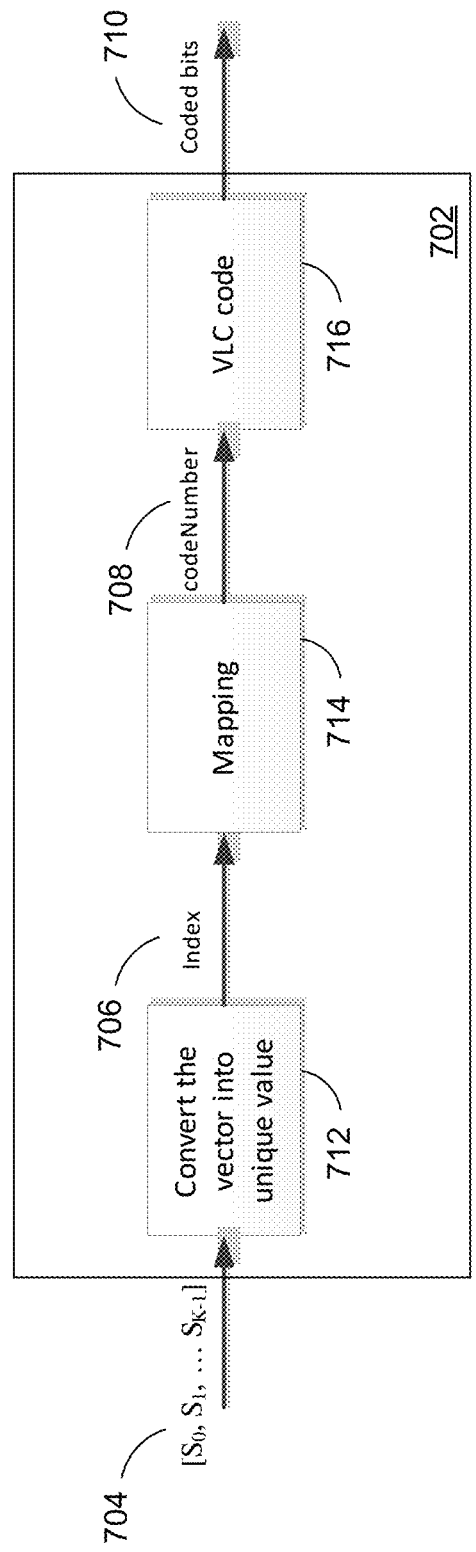
FIG. 7 illustrates an exemplary block diagram of a vector-based EC process.

FIG. 7 illustrates an exemplary block diagram of a vector-based EC process using a coder 702, which may correspond to the entropy encoder 140 illustrated in FIG. 2A. The coder 702 may be used to code a sample vector 704. The sample vector 704 may be similar to the sample vector 402 as illustrated in FIG. 4 and the sample vectors 604 as illustrated in FIG. 6.

As illustrated in FIG. 7, the sample vector 704 has a vector size K (e.g., $[S_0, S_1, \ldots S_{K-1}]$). In addition, the sample vector 704 may have a required sample size of B bits (e.g., the coder 702 may require B bits per sample to faithfully represent each sample in the group). For given K and B values, the total number of possible K-length sample vectors is $2^{BK}$. For example, when K=2 and B=1, the set of all possible 2-length sample vectors having samples able to be represented using 1 bit is 4, namely [−1, 0], [−1, −1], [0, 0], [0, −1] (when using 2's complement representation). Using the coding scheme illustrated in FIGS. 4-5, the coder 702 may code the suffixes corresponding each of these sample vectors using the same number of bits (e.g., BK bits, or 2 bits). As such, for a given combination of K and B values, the number of bits used to code a sample vector is the same regardless of which K-length sample vector in the set $2^{BK}$ possible vectors is being coded. This does not take into account the occurrence probability of each sample vector in the set.

However, when coding image information, certain sample vectors 704 may tend to be more probable in comparison to other sample vectors in the set of K-length sample vectors. In some embodiments, when the distribution of K-length sample vectors in the set of $2^{BK}$ vectors is not uniform (e.g., not all vectors in the set are equally probable), the coder 702 may code the K-length sample vectors 704 differently, based upon occurrence probability. For example, the coder 702 may code K-length sample vectors 704 that are more probable using fewer bits compared to K-length sample vectors 704 that are less probable. The techniques described below are directed to efficient coding strategies to code K-length sample vectors 704, when the set of possible K-length sample vectors are 704 drawn from a non-uniform distribution.

In some embodiments, the coder 702 may use a vector-based entropy coding (EC) method in order to more efficiently code a K-length sample vector 704, when the set of possible K-length sample vectors 704 are drawn from a non-uniform distribution. In some embodiments, the coder 702 may perform vector-based EC on the K-length sample vector 704 in a group by performing a conversion 712 to convert the given K-length sample vector 704 into a unique single value (e.g., an "index" 706). There may be a one to one correspondence between the K-length sample vector 704 and the "index" 706, The coder 702 may use the calculated index value 706 to perform a mapping 714 that maps the index value 706 to a "codeNumber" 708. Using a VLC code 716, the coder 702 may code the "codeNumber" 708 to form a sequence of coded bits 710 that may be transmitted to the decoder 165 as part of a video data bitstream. The VLC code 716 may be unstructured or structured. Examples of unstructured VLC codes 716 include Huffman, Arithmetic, while structured VLC coding may include Exponential-Golomb (EG), Golomb-Rice (GR), or mixture of EG and GR. At the decoder 165, upon parsing a single sequence of coded bits 710 (typically can be done in a single clock), all the K samples in the sample vector 704 can be reconstructed. Therefore, the use of vector-based EC may offer high throughput, typically K samples/clock.

In some embodiments, the coder 702 may perform the mapping 714 using a LUT (look up table, not shown) that can be used to map the calculated "index" value 706 to the "codeNumber" 708. The LUT can be constructed based upon the probability values of the K-length sample vectors 704 of a given group. For example, in some embodiments, the LUT may be constructed such that sample vectors 704 considered to be more probable are mapped to codeNumbers 708 with smaller values or that can be otherwise coded using fewer bits (e.g., codeNumbers 708 having shorter code lengths). For example, the codeNumbers 708 for sample vectors of higher probability may be coded using fewer than BK bits. In some embodiments, the LUT or data structure for mapping sample vectors 704 to codeNumbers 708 may be constructed such that sample vectors 704 considered to be more probable may be accessed more quickly or with higher priority when looking up a sample vector 704 in the LUT or data structure, allowing for quicker access by the decoder 165.

In some embodiments, the encoder 20 may store the same LUT for both the luma and chroma component samples, while in other embodiments different LUTs may be used for coding luma and chroma component samples. In addition, the decoder 30 may store its own copies of the LUTs or data structures used by the encoder 20. For example, the decoder 30 may, in response to receiving a bitstream of coded video data and decoding one or more codeNumbers 708, use its own LUTs to determine the corresponding sample vectors 704.

In some embodiments, the coder 702 uses a single LUT for all sizes B. In other embodiments, the coder 702 may use separate LUTs for different sizes of B. For example, in an embodiment, the coder 702 may use a first LUT1 when B=1, and a second LUT2 when size B=2, and so on. When the coder 702 selects a particular LUT based on size B, the coder 702 may code the coded sequence of bits 710 such that the type of LUT used may be explicitly signaled (e.g., LUT type=1 is signaled when B=1, LUT type=2 is signaled when B=2, and so forth). By signaling the type of LUT in the coded bits 710, the decoder 165 will be able to identify the corresponding LUT to be used when decoding the sequence of bits 710. In some embodiments, the signaling may be in the form of a unary code. Alternatively, signaling the LUT type in the coded bits 710 may be done using a fixed length code. In other embodiments, the coder 702 may use VLC codes such as Huffman or arithmetic to signal the LUT type in the coded bits 710.

Figure 8:
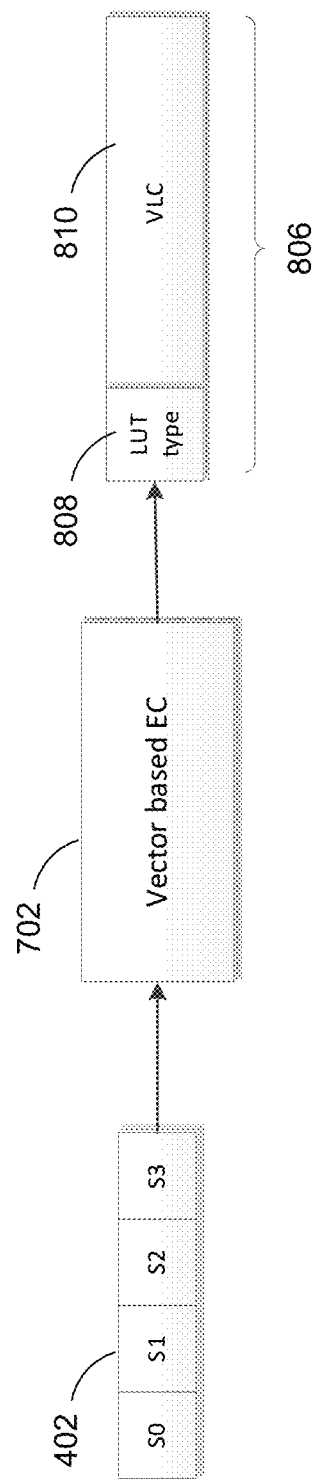
FIG. 8 shows the structure of vector-based EC that may be used to the code a group that contains sample of K=4, where the type of LUT used is explicitly signaled.

FIG. 8 shows an example of the coder 702 using vector based EC to the code the sample vector 402 containing K=4 samples to produce a sequence of coded bits 806. The coded bits 806 (which may correspond to the sequence of coded bits 710 illustrated in FIG. 7) may comprise an LUT type signal 808 and a vector based VLC code 810. The LUT type signal 808 explicitly signals the type of LUT (e.g., used to performing the mapping of index value 706 to code number 708 as illustrated in FIG. 7) that was used by the coder 702 to generate the coded bits 806. The vector based VLC code 810 represents all four samples in the sample vector 802. In some embodiments, the LUT type signal 808 may also indicate a number of bits B required to code the values of the samples of the sample vector 402.

In some embodiments, when the encoder 20 applies a non-uniform partitioning method (e.g., different K values) to construct the sample vectors 402 for a particular coding mode (e.g., transform mode), separate LUTs may be used for different sample vector sizes K, due to number of samples K in each sample vector being different. As such, different LUTs may be used corresponding to different B values, different K values, or different K and B value combinations.

The size of an LUT for mapping index values 706 to corresponding codeNumbers 708 may increase as size B increases. As such, in some embodiments, vector-based EC is only used by the coder 702 when the size B of the sample vector 402 is less than a certain threshold. This may be done in order to reduce memory requirements by not having the encoder 20 and decoder 30 store larger size LUTs for larger values of B. For example, when B exceeds the threshold limit, the coder 702 may code the sample vector 402 using non-vector based coding techniques (e.g., the DSU-VLC coding scheme illustrated in FIGS. 4-5). For example, in an embodiment where the threshold is 4, the coder 702 uses vector-based EC only when the received sample vector 704 has a size B=1, 2, or 3, while DSU-VLC coding (as illustrated in FIGS. 4-5) is used for sample vectors 704 having a size B greater than or equal to 4.

The techniques disclosed here can be applied to any coding mode used to code blocks of video data, such as Block prediction (BP), transform mode, BP skip mode, transform skip, MPP, or MPPF. In embodiments where the vector-based entropy coder 702 applies vector-based EC for more than one coding mode, each coding mode may be associated with its own LUT, or a common LUT may be associated with multiple modes. Whether a common LUT or separate LUTs are used may be determined based upon a trade-off between the memory requirements and performance. For example, in some embodiments BP and Transform may use the same LUT(s) or data structures to map indices 706 to codeNumbers 708, while in other embodiments, BP and Transform may use the different LUTs or data structures. In some embodiments, the coder 702 may use vector-based EC only in specific modes (e.g., BP mode), while other coding techniques are used in other modes (e.g., non-BP mode). In addition, the techniques disclosed here can be applied to any type of sampling format, e.g., 4:4:4, 4:2:2, 4:2:0.

Figure 9:
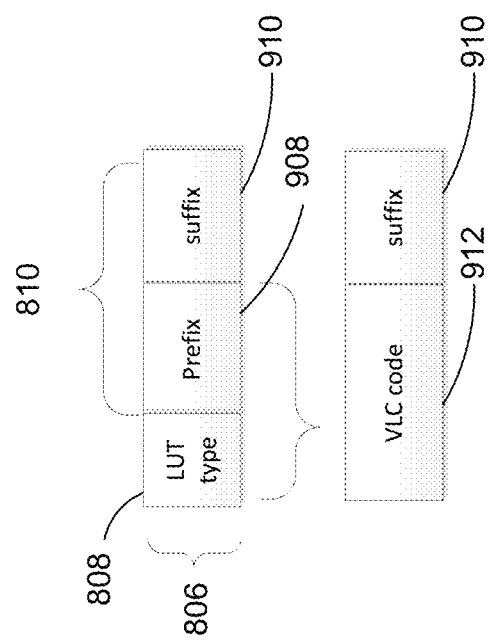
FIG. 9 illustrates a code comprising a combined LUT type signal and the VLC code prefix.

FIG. 9 illustrates an example of a sequence of coded bits 806 where the LUT type signal 808 is combined with a prefix of the VLC code 810. Some types of VLC codes 716 that may be used by the coder 702 to code the codeNumber 708 (such as structured VLC codes such as EG, GR, or a mixture of EG and GR) may result in the VLC code 810 that comprises a prefix 908 and a suffix 910. In some embodiments, the prefix 908 of the VLC code 810 may be in unary code or some other code format that may be time-consuming for a decoder (e.g., decoder 165) to process, while the suffix 910 may be of fixed length. In order to reduce processing time, the coder 702 may combine the prefix 908 and the LUT type signal 808 into a single VLC code portion 912.

For example, as illustrated in FIG. 9, the coder 702 may combine and code the variable length portions of the coded bits 806 (e.g., the LUT type signal 808 and the prefix 908)

through a second stage of VLC coding (not shown) to form a VLC code portion 912. In some embodiments, the second stage of VLC coding may be performed by the entropy encoder 140 as illustrated in FIG. 2A. Because both the LUT type signal 808 and VLC code prefix 908 may be in unary code or some other processing expensive format, performing the second stage of VLC coding may serve to decrease an amount of processing needed for the decoder 165 that receives the coded bits 806 to process the LUT type signal 808 and VLC code prefix 908. In some embodiments, the coder 702 may use a second separate LUT (not shown) to map the LUT type signal 808 and prefix 908 to a single code number. The coder 702 may then code the resulting code number (e.g., using the second stage VLC code) to form the VLC code portion 912. When received by the decoder 165, the decoder 165 may first decode the VLC code portion 912 to determine the LUT type signal 808 and the prefix 908 of the full VLC code 810, in order to obtain the full coded sequence of bits 806. In some embodiments, the second stage VLC code used to code the variable length portions of the coded bits 806 may be the same type of VLC code 716 used to code the codeNumber 708 to form the sequence of coded bits 806. In other embodiments, the second stage VLC code may be different from the VLC code 716.

Sign Magnitude Coding

As discussed above, the size B may represent the number of bits required to faithfully represent all the samples in a given group (e.g., sample vector 402, 604, or 704). In some embodiments the value of B may be calculated based on 2's complement representation, where B-bits are required to represent the sample values from $-(2^{B-1})$ to $+(2^{B-1}-1)$. However, the techniques disclosed herein are not limited to embodiments using 2's complement registration, and can be applied for sample values calculated using other types of representation. For example, in some embodiments, the encoder 20 may code sample values using sign-magnitude representation, where B-bits are required to represent the sample values in range from 0 to $2^B-1$.

Figure 10A:
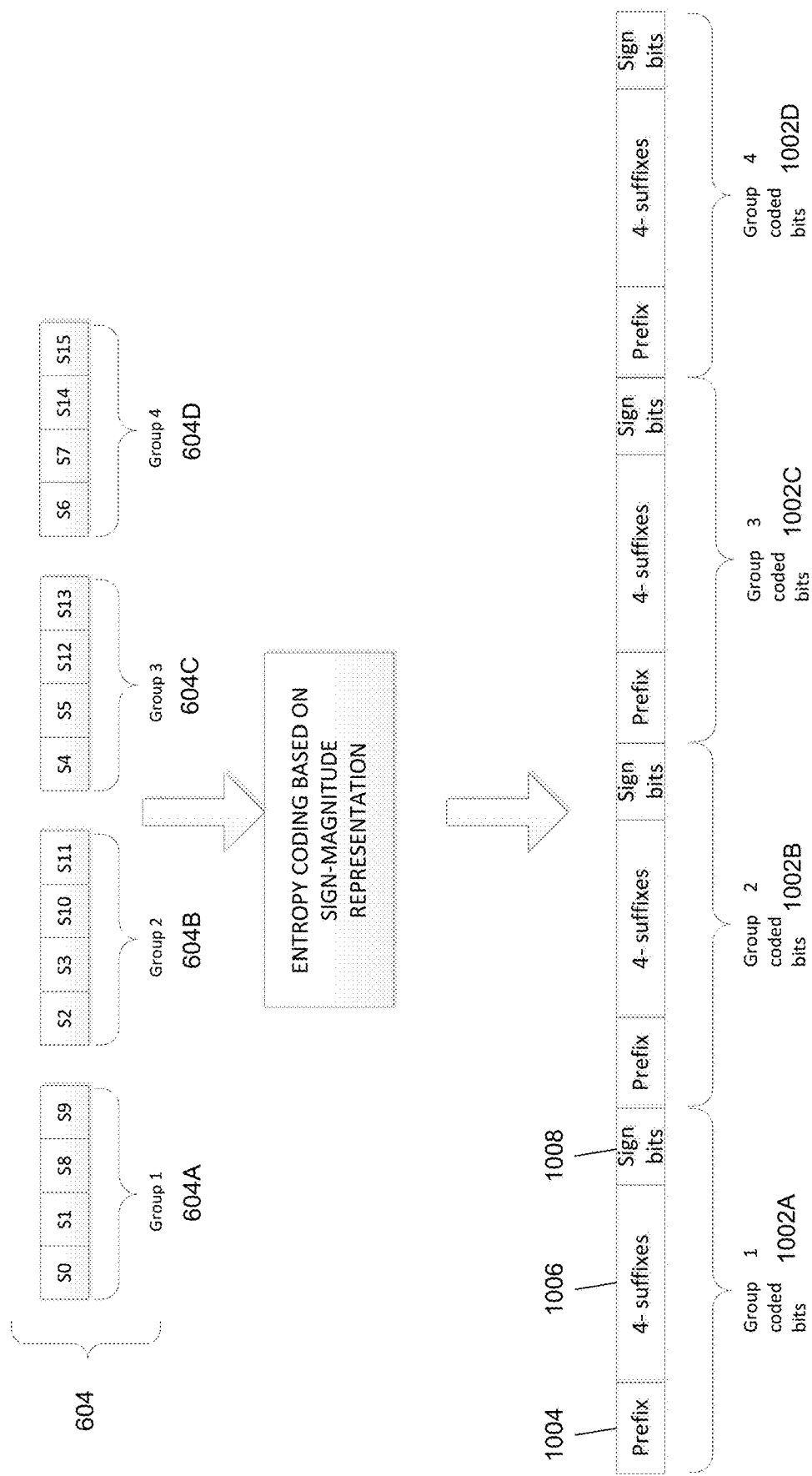
FIGS. 10A and 10B illustrate an example of entropy coding a plurality of sample vectors using sign-magnitude representation.

FIG. 10A shows an example of entropy coding of the exemplary sample vectors 604 (e.g., as illustrated in FIG. 6) using sign-magnitude representation. When sign-magnitude representation is used in certain embodiments, the coder 702 may code the absolute values of the samples in the sample vectors 604 (also referred to as the magnitude or absolute part), followed by sign bit coding corresponding to the sign values of the samples of sample vectors 604.

The coder 702 may code each of sample vectors 604A through 604D to form a respective group of coded bits 1002 (e.g., groups 1002A, 1002B, 1002C, and 1002D). Each group of coded bits 1002 comprises a prefix part 1004, a suffix part 1006, and zero or more sign bits 1008. The prefix part 1002 indicates the number of bits B needed to signal the maximum absolute value of the samples in the respective sample vector 604. The suffix part 1006 represents the absolute value of each sample of the respective sample vector 604. Finally, the sign bits 1008 represent the sign values for non-zero samples of the respective sample vector 604.

As an example, assume that the sample vector 604A contains 4 samples having values of [1, −3, −1, 0]. In this example, the prefix part 1004 of the coded bits 1002A indicates a value of B=2 (which is calculated from the absolute values [1, 3, 1 0]). The suffix part 1006 may comprise portions corresponding to the absolute sample values of the sample vector 604A (e.g., coded as 01, 11, 01, 00). The sign bits 1008 may indicate the sign values for each of the non-zero samples of the sample vector 604A. For example, the sign bits 1008 may be signaled as '100', where '1' indicates positive, '0' indicates negative. The sign for samples of sample vector 604A having zero value is not signaled in the sign bits 1008.

In some embodiments, the coder 702 may code the sample vector 604A using vector-based entropy coding (e.g., as illustrated in FIGS. 7-8) on the magnitude or absolute part of the samples of the sample vector 604. The absolute values of the samples in the sample vector 604A may be coded using vector-based techniques disclosed herein.

For example, for the sample vector 604A comprising the four samples S0, S1, S8, and S9, the vector-based entropy coder 702 may apply vector-based EC to the absolute value of the samples in the group, such as |S0|, |S1|, |S8|, |S9| to produce the prefix part 1004 and the suffix part 1006. The prefix part 1004 may indicate a type of LUT used, while the suffix part 1006 may correspond to a codeNumber from which the absolute values of all samples of the sample vector 604A can be determined.

On the other hand, the coder 702 may signal the sign bits 1008 of the samples S0, S1, S8, and S9 separately without using vector-based entropy coding. For example, the sign bits 1008 may be signaled using a fixed length code, where 1-bit is signaled per non-zero sample to indicate whether the sample is positive or negative. In some embodiments, a sign bit is not signaled when the corresponding sample value is zero.

Figure 10B:
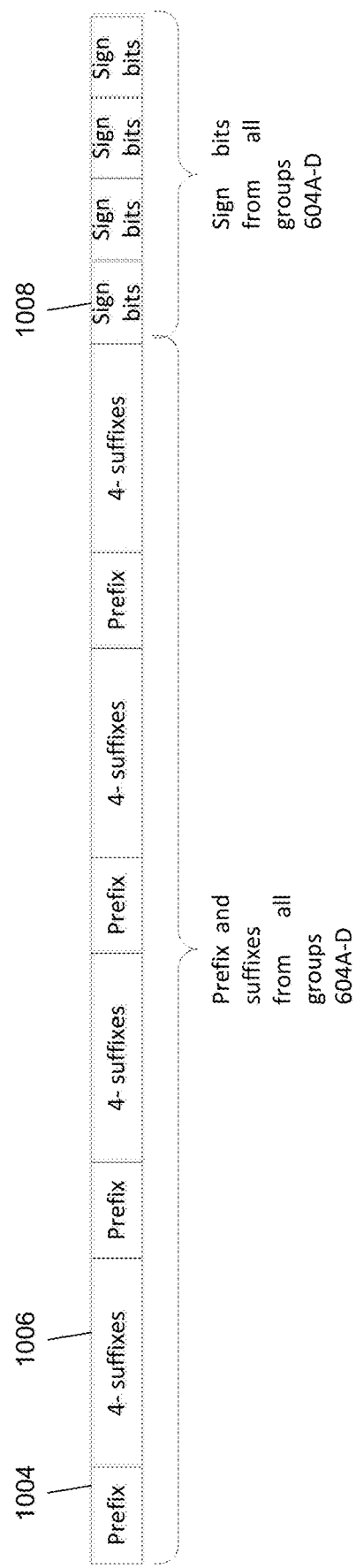

FIG. 10B illustrates an alternate arrangement for coding sample vectors 604 using sign-magnitude representation, in accordance with some embodiments. In some embodiments, the coder 702 may code sign bits 1008 for the plurality of sample vectors 604A through 604D in the bitstream after the prefix portions 1004 and suffix portions 1006 for each of the plurality of sample vectors 604A through 604D have been coded. For example, in some embodiments, the coder 702 may code the prefix portions 1004 and suffix portions 1006 of all sample vectors 604A-D first in the bitstream, while the sign bits 1008 of all groups 604A-D may be coded in the bitstream after all prefix portions 1004 and suffix portions 1006 have been coded.

When compared to two's complement representation, an advantage of sign-magnitude representation provides is that the sign information for symbols whose value is zero is not signaled. Therefore, sign-magnitude representation can result in superior coding performance, e.g., in modes where the zero value is more probable, such as block prediction and transform mode.

As described above, the coder 702 may use sign-magnitude representation to code a sample vector 604, wherein the sign bit for a sample of the sample vector 604 corresponding to a value of zero is not signaled in the sign bits 1008. As such, the parser logic of a decoder 30 may need to reconstruct or decode the samples of the sample vector 604 (coded as the suffix part 1006) to know whether to read sign information from sign bits 1008 for each of the samples of sample vector 604 from the bit stream. In some embodiments, the parser of the decoder 30 may be implemented as part of the substream demultiplexor 160.

In other words, the parser logic of the decoder 30 needs to know whether each sample of the sample vector 604 has a zero or non-zero value before it can parse the sign bits 1008 for the sample vector 604. If a sample value is non-zero, then the decoder 30 parses the sign information for the sample from the bit stream as part of the sign bits 1008. Otherwise, if the sample value is zero, the sign bit is not read from the bit stream. Because of this dependency between the parsing and decoding functions (e.g., to decode the sample, implemented as the entropy decoder 165) of the decoder 30, the maximum decoder throughput of the decoder 30 may in some embodiments be reduced.

In some embodiments, in response to receiving a coded sample vector from the video data bitstream, the parser may decode a prefix of the received coded sample vector, which may be in unary code, in order to determine a length of each suffix portion of the sample vector. The parser may then retrieve a fixed number of bits corresponding to the suffix of the sample vector for decoding by the entropy decoder 165, and then proceed to the next sample vector during the next clock cycle.

The decoder (e.g., entropy decoder 165) receives the bits from the parser corresponding to the suffix of the coded sample vector. The decoder 165 may then decode the received bits to determine a codeNumber 708. The decoder 165 may then map the codeNumber 708 to an index value 706 using an LUT, which in turn be used to obtain the actual sample values of the sample vector. In some embodiments, this decoding may be performed in the next clock cycle after the parser has parsed the coded sample vector (e.g., the same clock cycle that the parser is parsing the subsequent sample vector).

FIG. 11 illustrates an exemplary graph 1100 illustrating a number of clock cycles that may be needed to parse and decode the sample vectors 604A-D coded using sign-magnitude, in accordance with some embodiments. In some embodiments, the decoder 30 may be able to parse the prefix portion 1004 and suffix portion 1006 of each sample vector 604 in a single clock (as the prefix portion 1004 would directly identify the number of bits in the suffix portion 1006). Considering the sample vectors 604A-604D as illustrated in FIG. 10A, in some embodiments the decoder 30 may need at least 5 clock cycles to parse the 4 sample vectors 604A through 604D.

In clock cycle 1, the decoder 30 parses sample vector 604A prefix and suffix parts. In clock cycle 2, the decoder 30 parses sample vector 604B prefix and suffix parts. At the same time, the decoder 30 decodes the absolute sample values of the sample vector 604A, and parses the sign bits for the sample vector 604A. In clock cycle 3, the decoder 30 decodes sample vector 604B absolute sample values, and parses sample vector 604B sign bits, as well as sample vector 604C prefix and suffix parts. In clock cycle 4, sample the decoder 30 decodes sample vector 604C sample values, and parses sample vector 604C sign bits and vector 604D prefix and suffixes. An additional clock cycle (clock cycle 5) is needed for the decoder 30 to decode the sample vector 604D absolute values in order to parse the corresponding sign information for the sample vector 604D. Therefore, this representation as illustrated in FIG. 10A may reduce the maximum achievable throughput of the decoder 20 in some embodiments. Similar conclusions may be derived when the absolute sample values of each sample vector are coded using vector entropy coding.

In some embodiments, as illustrated in FIG. 10B, the sign bits 1008 corresponding to the plurality of sample vectors 604A-D may be located after the prefix portions 1004 and suffix portions 1006 of the groups 604A-D in the bitstream. In these cases, the decoder 30 may parse the sign bits 1008 a clock cycle after the parsing of the prefix and suffix of the last sample vector of the plurality of sample vectors (e.g., group 604D). As such, when all sample vectors of the plurality of sample vectors 604A-D are coded using sign-magnitude, the decoder 30 may need an extra clock cycle (e.g., clock cycle 5) to parse the sign bits 1008 after parsing the prefixes and suffixes of the sample vectors 604A-D, potentially reducing maximum achievable throughput of the decoder 165. For example, to parse n groups 604, the decoder 30 may require n+1 clock cycles.

Figure 12:
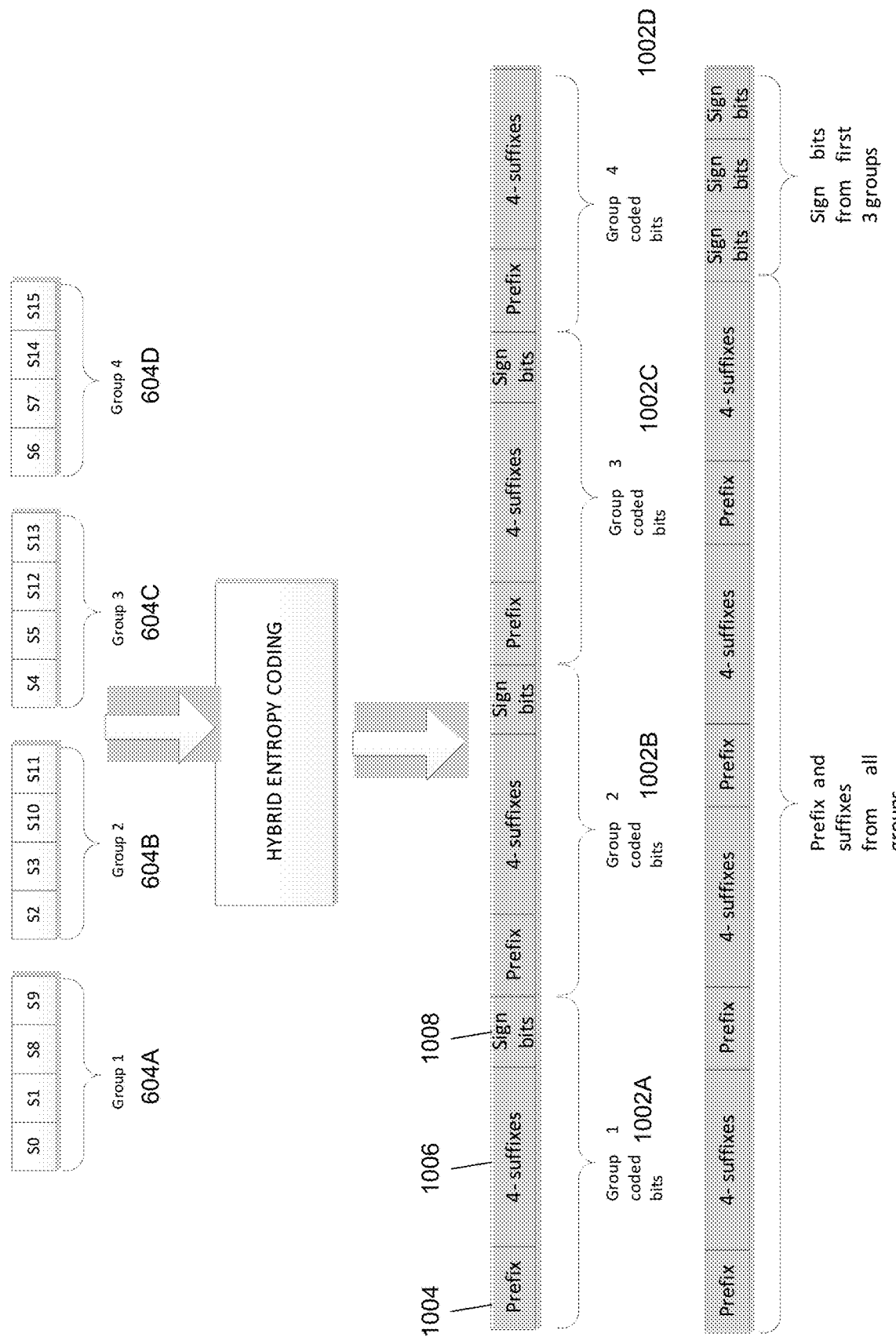
FIG. 12 illustrates an example of hybrid entropy coding of a plurality of sample vectors.

FIG. 12 illustrates an example of hybrid entropy coding of the exemplary sample vectors 604 (e.g., as illustrated in FIG. 6). In some embodiments, in order to increase the throughput of the decoder 30, the coder 702 may use a hybrid method. For example, the coder 702 may code an initial number of sample vectors 604 (e.g., sample vectors 604A-C) using sign-magnitude representation. On the other hand, the coder 702 may code the remaining sample vectors (e.g., sample vector 604D) using a different representation, such as two's complement representation. The coder 702 may code each of the sample vectors 604A-D based on DSU-VLC (as illustrated in FIGS. 4-5) or vector-EC (e.g., as illustrated in FIGS. 7-9). For example, the vector-EC for two's complement representation may be based on FIG. 8 where the symbols of a sample vector 604 are mapped to a single codeNumber 708. On the other hand, in sign-magnitude representation, coder 702 may map the set of absolute values of each symbol of the sample vector 604 to a single codeNumber 708, while the sign bits 1008 for the sample vectors 604 may be signaled separately for each non-zero symbol of the sample vector 604.

In one exemplary embodiment for coding four sample vectors 604A-D, sign-magnitude representation is used for the first 3 sample vectors 604A-C, while two's complement representation is used for the last sample vector 604D. FIG. 13 illustrates an exemplary graph 1300 illustrating a number of clock cycles that may be needed to parse and decode the sample vectors 604A-D coded using the hybrid coding scheme illustrated in FIG. 12, in accordance with some embodiments. By pipelining the parser and symbol decoder 165 as described above, during the $4^{th}$ clock cycle, samples of sample vector 604D are parsed by the decoder 165 while samples of sample vector 604C are decoded. Because the samples of the sample vector 604D are encoded by the coder 702 based on two's complement representation, there is no need for the decoder 165 to decode the absolute sample values of the sample vector 604D to parse sign bits for sample vector 604D. Therefore, using hybrid methods it may be possible for the decoder 30 to parse all the 4 sample vectors 604A-D in four clock cycles. Thus, in some embodiments, in order to avoid needing an extra clock cycle when parsing n sample vectors, the coder 702 may code the first n−1 sample vectors using sign-magnitude representation, while coding the last sample vector using a different representation such as two's complement representation. Thus, the decoder 30 may be able to parse n sample vectors in n clock cycles.

In some embodiments, the coder 702 may determine whether to use two's complement or sign-magnitude representation based on the number of sample vectors 604 having non-zero sample values. In one example, the coder 702 may use two's complement representation for the last sample vector 604D only if each of the previous sample vectors 604A through 604C contains at least one non-zero sample value. Otherwise, the coder 702 may use sign-magnitude representation to code the last sample vector 604D. In some embodiments, using two's complement to code the last sample vector 604D may entail some loss in compression efficiency. By coding the last sample vector 604D in two's complement only when each of the three sample vectors 604A through 604C contains at least one non-zero sample value (thus necessitating the coding of sign bits 1008), use of two's complement may be minimized by using it only when necessary to achieve the desired throughput. For example, if one of the three sample vectors 604A through 604C does not contain at least one non-zero sample value, then the sample vector may be coded using group skip mode. The decoder 30 may thus be able to parse the sample vectors 604A through 604C more quickly, allowing for all four sample vectors to be parsed within four clock cycles.

In the above example, DSU-VLC based entropy coding is used for both sign-magnitude and two's complement representation. However, the same techniques can be extended to vector EC for both representations.

Process Flow

It should be noted that aspects of this disclosure have been described from the perspective of an encoder, such as the video encoder 20 in FIG. 2A, or portions of an encoder, such as vector based entropy coder 804 illustrated in FIG. 8. The reverse operations to those described above may be applied to decode the generated bitstream by, for example, the video decoder 30 in FIG. 2B.

Figure 14A:
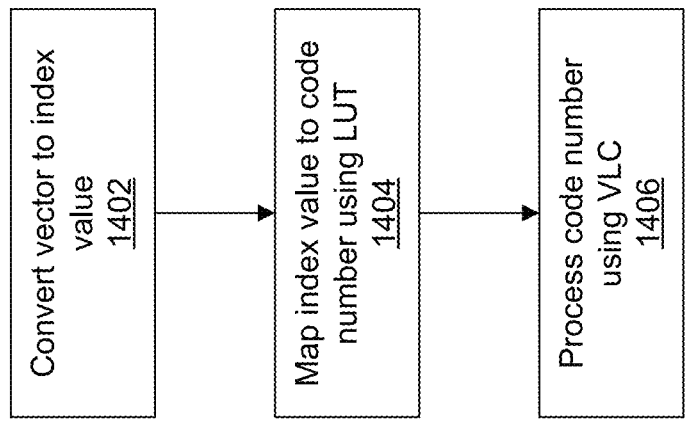
FIGS. 14A and 14B illustrate flowcharts of processes for encoding/decoding sample vector data.
Figure 14B:
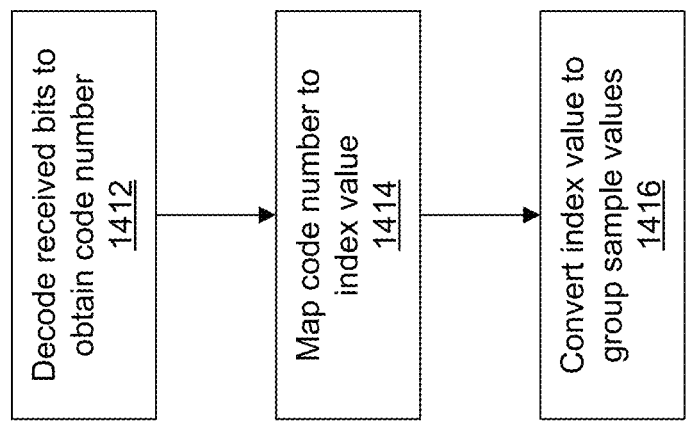

For example, FIG. 14A illustrates a flowchart of a process for encoding sample vector data, while FIG. 14B illustrates a flowchart of a process for decoding received bit sequences corresponding to sample vector data. For example, as illustrated at block 1402 of FIG. 14A, the encoder converts a received sample vector to an index value. In some embodiments, a one-to-one correspondence between sample vectors and index values exists, such that no two different sample vectors will have the same index value. At block 1404, the encoder mays the index value to a code number using an LUT. The LUT may be constructed based at least in part upon an occurrence probability of a given sample vector of a group of possible sample vectors. In some embodiments, the encoder may identify the LUT based upon a coding mode used to code the sample vector, a number of bits required to represent each sample value of the sample vector, a number of sample values in the sample vector, and/or the like. At block 1406, the encoder codes the code number using a VLC scheme to form a sequence of coded bits, to be stored or transmitted as part of a bitstream.

As illustrated in block 1412 of FIG. 14B, the decoder decodes a received sequence of bits (e.g., from a received bitstream) using a VLC scheme to form a code number. At block 1414, the decoder maps the code number to an index value using an LUT. In some embodiments, the decoder identifies the LUT type used to perform the mapping based upon an indication received as part of the sequence of bits (e.g., as a prefix portion of the sequence). At block 1416, the decoder converts the index value into values for a sample vector.

Figure 15:
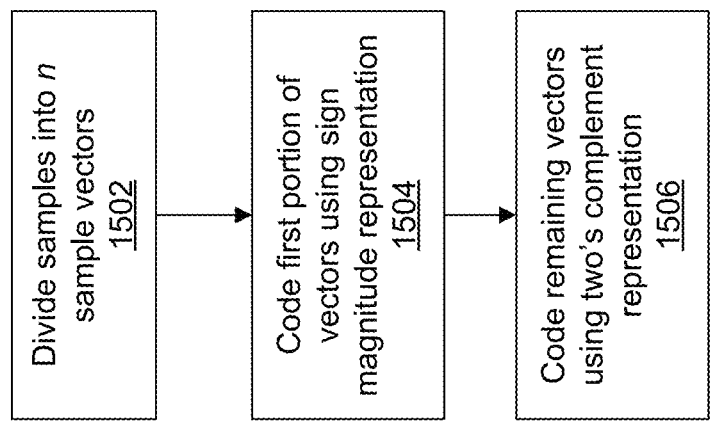
FIG. 15 illustrates a flowchart of an exemplary process for encoding sample vector data using hybrid coding.

FIG. 15 illustrates a flowchart of an exemplary process for encoding sample vector data using hybrid coding. At block 1502, the encoder receives a plurality of sample values, and divides the received sample values into n sample vectors. At block 1504, the encoder codes a first portion of the n sample vectors using sign-magnitude representation. In some embodiments, the first portion of sample vectors may comprise the first n−1 sample vectors of the n sample vectors. At block 1506, the encoder codes one or more remaining sample vectors of the n sample vectors using two's complement representation. In some embodiments, the one or more remaining sample vectors may comprise the last sample vectors of the n sample vectors. In some embodiments, the encoder only codes the one or more remaining sample vectors in two's complement representation if each of the first portion of sample vectors contains at least one sample having a non-zero value. By coding the first portion of sample vectors of the n sample vectors using sign-magnitude representation, and the remaining groups using two's complement representation, the advantages of coding using sign-magnitude representation may be realized, while avoiding a reduction of decoder throughput that may be caused by needing to decode sign bits of non-zero sample values after the absolute values of all sample values of the n sample vectors has been decoded.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including applications in wireless communication device handsets, automotive, appliances, wearables, and/or other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an IC or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. An apparatus for coding video information having a plurality of video samples, the apparatus comprising:
   a memory configured to store a plurality of video samples arranged in a plurality of groups, each video sample having a bit size B and a respective group of the plurality of groups having a group size K; and
   a hardware processor, the hardware processor configured to code a respective K-length sample vector of the plurality of the video samples in each group of the plurality of groups to form respective vector-based codes using a variable length coding (VLC) scheme, the respective vector-based codes comprising at least a first portion identifying a type of look-up-table among a plurality of types of look-up table corresponding to at least one of the bit size B or the group size K, and a second portion representing the plurality of video samples in the respective group,
   the hardware processor further configured to code the plurality of video samples in sign magnitude representation in a first number of groups of the plurality of groups,
   the hardware processor further configured to code the plurality of video samples in 2's complement representation in a last group of the plurality of groups, and
   the hardware processor further configured to output the respective vector-based codes, wherein to code the respective K-length sample vector to form the respective vector-based codes, the hardware processor is configured to:
   convert the respective K-length sample vector to an index value,
   map the index value to a code number using the type of look-up table,
   code the first portion of the respective vector-based code to indicate the type of look-up table, and
   code the code number to form the second portion of the respective vector-based code.

2. The apparatus of claim 1, wherein the hardware processor is further configured to:
   decode the respective vector-based codes to form respective code numbers using a variable length coding (VLC) scheme;
   map the respective code numbers to respective index values using the respective type of look-up-table identified by the first portion of the respective vector-based codes; and
   convert the respective index values to the plurality of video samples of the respective group.

3. The apparatus of claim 1, the hardware processor is configured to provide the respective vector-based codes when the bit size B is less than a threshold value.

4. The apparatus of claim 1, wherein the type of look-up-table is based at least in part upon an occurrence probability of the respective group out of a set of possible K-sized groups.

5. A method for coding video information having a plurality of video samples, the method comprising:
   storing a plurality of video samples arranged in a plurality of groups, each video sample having a bit size B and a respective group of the plurality of groups having a group size K;
   coding a respective K-length sample vector of the plurality of the video samples in each group of the plurality of groups to form respective vector-based codes using a variable length coding (VLC) scheme, the respective vector-based codes comprising at least a first portion identifying a type of look-up-table among a plurality of types of look-up table corresponding to at least one of the bit size B or the group size K, and a second portion representing the plurality of video samples in the respective group, wherein the coding includes:
   coding the plurality of video samples in sign magnitude representation in a first number of groups of the plurality of groups, and
   coding the plurality of video samples in 2's complement representation in a last group of the plurality of groups, and
   wherein coding the respective K-length sample vector to form the respective vector-based codes comprises:
   converting the respective K-length sample vector to an index value,
   mapping the index value to a code number using the type of look-up table,
   coding the first portion of the respective vector-based code to indicate the type of look-up table, and
   coding the code number to form the second portion of the respective vector-based code.

6. The method of claim 5, further comprising:
   decoding the respective vector-based codes to form respective code numbers using a variable length coding (VLC) scheme;
   mapping the respective code numbers to respective index values using the respective type of look-up-table identified by the first portion of the respective vector-based codes; and converting the respective index values to the plurality of video samples of the respective group.

7. The method of claim 5, further comprising:
providing the respective vector-based codes when the bit size B is less than a threshold value.

8. The method of claim 5, wherein the type of look-up-table is based at least in part upon an occurrence probability of the respective group out of a set of possible K-sized groups.

* * * * *